United States Patent [19]
Ogawa

[11] Patent Number: 5,142,314
[45] Date of Patent: Aug. 25, 1992

[54] STOPPING POSITION CONTROL DEVICE

[75] Inventor: Kimiaki Ogawa, Tokyo, Japan

[73] Assignee: Asahi Kogaku Kogy Kabushiki Kaisha, Tokyo, Japan

[21] Appl. No.: 780,378

[22] Filed: Oct. 23, 1991

Related U.S. Application Data

[63] Continuation of Ser. No. 492,892, Mar. 13, 1990, abandoned.

Foreign Application Priority Data

Mar. 29, 1989 [JP] Japan ................. 1-31580 [U]

[51] Int. Cl.⁵ ............................................. G03B 1/18
[52] U.S. Cl. .................................................. 354/195.1
[58] Field of Search ............ 354/195.1, 195.11, 195.12, 354/195.13, 400, 402, 199, 200, 201

[56] References Cited

U.S. PATENT DOCUMENTS

| | | | |
|---|---|---|---|
| 4,445,757 | 5/1984 | Enomoto et al. | 350/429 |
| 4,446,526 | 5/1984 | Iwanade | 364/525 |
| 4,944,030 | 7/1990 | Haraguchi et al. | 354/195.12 X |
| 4,958,177 | 9/1990 | Akitake | 354/195.1 |

Primary Examiner—L. T. Hix
Assistant Examiner—Howard B. Blankenship
Attorney, Agent, or Firm—Sandler, Greenblum & Bernstein

[57] ABSTRACT

A stopping control device includes a stripe pattern formed on an object to be moved and a non-contact type sensor for sensing a boundary between the stripes of the pattern. The stopping mechanism stops the object after a predetermined time has passed after a boundary was sensed so that the sensor beam is positioned at an approximate center of a stripe. The sensor may be a photo reflector sensing a reflectance of each part of the stripes, to sense a boundary therebetween.

9 Claims, 3 Drawing Sheets

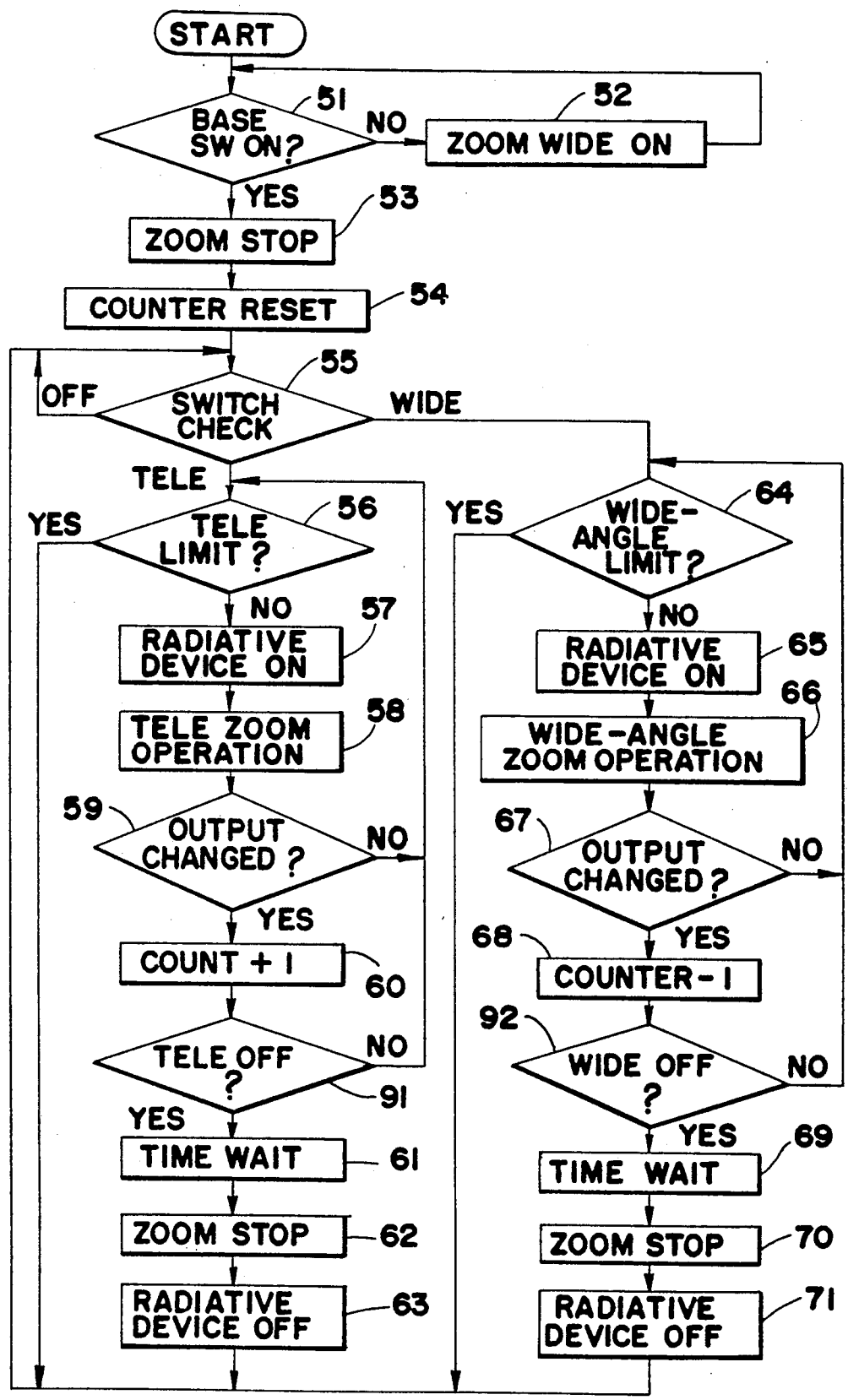

5,142,314

STOPPING POSITION CONTROL DEVICE

This application is a continuation of application Ser. No. 07/492,892, filed Mar. 13, 1990, now abandoned.

BACKGROUND OF THE INVENTION

1. Field of the Invention

The present invention relates to a stopping position control device which controls the stopping of an object at a predetermined position (hereinafter referred to as stopped position).

2. Description of the Related Art

Recently, especially with regard to compact cameras, many cameras equipped with a power zoom lens have been developed. When a zoom lens is utilized usually the full-opened aperture value is changed in accordance with a focal length of the lens, and accordingly, the full-opened aperture value must be input to the camera control mechanism to carry out an automatic exposure control with a zoom lens. Further, in a camera in which an exposure program, for example, is changed in accordance with a focal length, data relating to the focal length of the lens must be input to the camera control mechanism.

Therefore, in a conventional device, the position of a zoom ring, which causes zoom lens groups (a variator lens and a compensator lens) to move relatively close to and apart from each other, is sensed and a corresponding full-opened aperture value and focal length of the lens are obtained from the lens position data. It is noted that no particular problem arises if the full-opened aperture value and the focal length of the lens are not continuously obtained, and thus this data can be obtained at predetermined intervals.

Two methods of sensing a stopped position of the zoom ring are known; one in which a range of movement of the zoom ring is divided into a plurality of sections, each section is given a different code, and the codes are discriminated by a code discrimating mechanism, and another in which periodically varied codes are given to the entire range of movement of the zoom ring and a code change counting mechanism is used to count the number of changes of the codes from the base position thereof.

In the former method, digital codes composed of a combination of electro-conductive elements and insulating elements are provided at each division of the range of movement along a direction of movement of the zoom ring. The digital codes are read by a brush kept in slidable contact with the electro-conductive element and the insulating element at each bit, respectively.

In a position sensing mechanism using such codes and a brush, however, due to deterioration with the passage of time, for example, by rust or transformation of the electro-conductive parts, or due to the presence of foreign matter between the code plate and the brush, a poor contact therebetween is obtained, and accordingly, reading errors easily occur.

On the other hand, an optical method of code counting is known in which an optical stripe pattern composed of high reflectance elements and low reflectance elements are arranged alternately along a direction of movement of a cam ring. The number of changes of the optical stripe pattern are read and counted by an optical mechanism (a photo reflector) provided at a fixed position on a camera body, whereby a position of the zoom ring is sensed according to the count of the number of changes from the base position thereof.

In this stopping position sensing mechanism, however, if the zoom ring stops when a beam from the photo reflector is at a boundary between the stripes of the pattern, one of two states occur, i.e., a change of a stripe is read and the zoom ring then stopped, or a change of stripe is not read and the zoom ring is stopped. Also, when the movement of the zoom ring resumes after the zoom ring has been stopped on a stripe boundary, a change of a stripe may or may not be read.

This uncertainty, i.e., the reading or the not reading of the change, is a reading error which is accumulated, whereby the error in the full-opened aperture value is increased. Further, in such a case, to prevent an overrun of the zoom ring, a limit switch must be provided at a position opposite to the base position of the zoom ring, and this provision of the limit switch inevitably increases the cost of the camera.

In the electrical reading mechanism described above, the electro-conductive elements and the insulating elements can be replaced by an optical pattern including two kinds of elements having different optical reflectances, and the brush replaced by a plurality of photo reflectors for discriminating the optical pattern of each bit.

A photo reflector, however, is bulkier than a brush, and therefore, the size of the camera must be increased to enable the accommodation therein of a plurality of photo reflectors, and thus the cost thereof is inevitably increased.

SUMMARY OF THE INVENTION

Therefore, an object of the present invention is to provide a stopping position control device by which a moving object such as a lens drive ring is accurately stopped at a predetermined position, whereby accurate data of the position of the object is obtained.

According to the present invention, there is provided a stopping position control device comprising a pattern provided in a line along which the object is moved and having characteristics which change in a regular manner along the line. The stopping position control device further comprises a means for discriminating the characteristics of the pattern, and a means for stopping the object when a predetermined time has passed after the discriminating means has sensed a change of the pattern characteristics.

BRIEF DESCRIPTION OF THE DRAWINGS

The present invention will be better understood from the description of the preferred embodiments of the invention set forth below, together with the accompanying drawings, in which:

FIG. 3 is a flow chart showing the operation of a second embodiment of the present invention.

DESCRIPTION OF THE PREFERRED EMBODIMENTS

Figure 1:
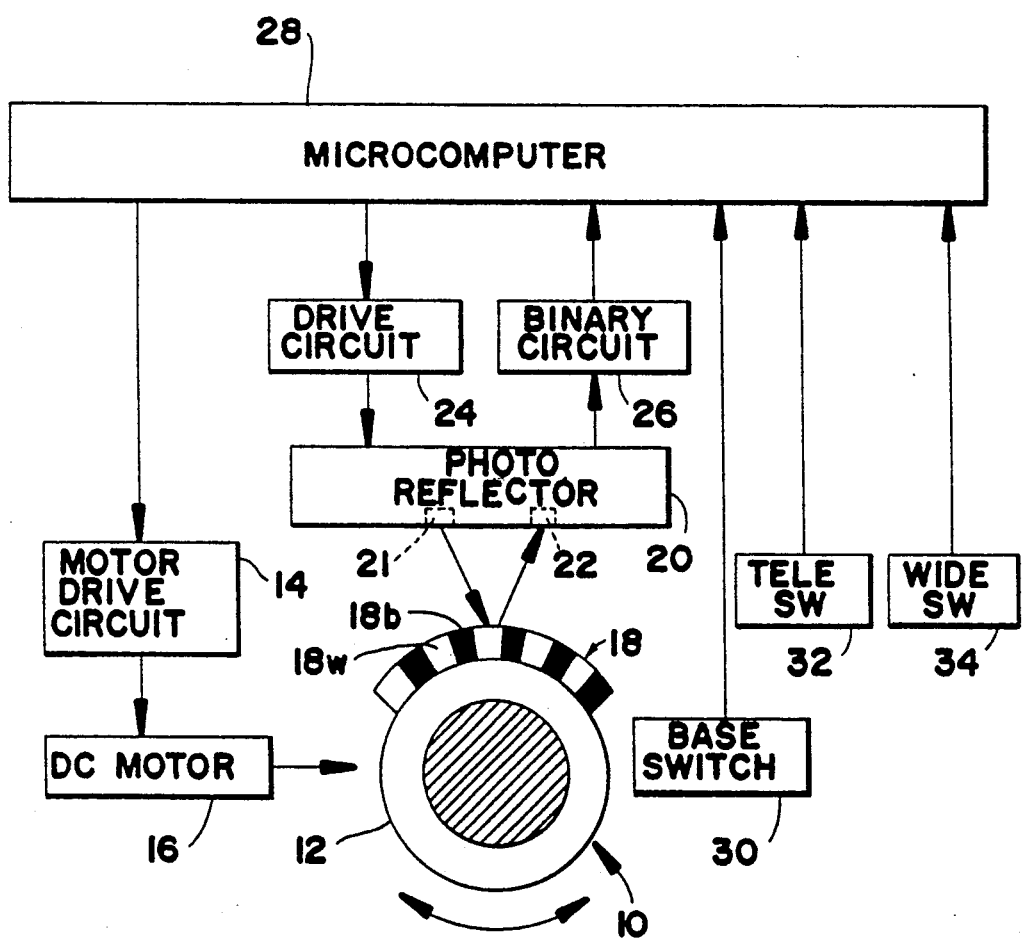
FIG. 1 is a block diagram showing a construction of a lens data reading device for a zoom lens to which an embodiment of the present invention is applied.

The present invention will now be described with reference to embodiments shown in the drawings.

FIG. 1 is a block diagram showing major components of an embodiment in which the present invention is applied to a camera having a power zoom lens.

As shown in the Figure, a zoom lens 10 is provided with a lens drive ring which is rotated to move lens groups provided in the zoom lens 10. Namely, the zoom lens 10 is constructed in such a manner that the zoom lens groups (a variator lens and a compensator lens) are moved, by a rotational motion of a zoom ring 12, i.e. the lens drive ring, close to and apart from each other along the optical axis of the lens, to perform a zooming operation. This zoom ring 12 is driven by a DC motor 16, which is driven by a motor drive circuit 14, to rotate in the forward and reverse directions to cause the zoom lens to move to the telephoto mode or a wide-angle mode.

A stripe pattern 18 for sensing a stopped position of the zoom ring 12 is applied on an outer surface of the zoom ring 12. The stripe pattern 18 is constituted by black stripes 18b and white stripes 18w alternately, provided in a regular pattern. The stripe pattern 18 is provided along a direction of rotation of the zoom ring 12 and in a range covering the range of rotation of the zoom ring 12.

A photo reflector or a photo coupler 20 is disposed at a position facing the stripe pattern 18. This photo reflector 20 is a non-contact type sensor sensing a reflectance of the stripe pattern 18, and includes a radiative device (IRED (infrared rays)) 21 and a photo detector 22. The radiative device 21 radiates a sensing beam to the pattern 18, and the sensing beam is reflected by the stripe pattern 18 into the photo detector 22.

The surface of the stripe pattern 18 is composed of black and white stripes 18b and 18w, and accordingly, the quantity of the reflected beam received by the photo detector 22 is at a maximum when the sensing beam is reflected by the white stripes 18w and at a minimum when the sensing beam is reflected by the black stripes 18b. When the sensing beam is reflected at a boundary between the black and white stripes 18b and 18w, the quantity of the reflected beam is an intermediate value corresponding to the proportions of black and white on each side of the boundary. Namely, the characteristics of a beam reflected by the pattern 18 are regularly changed in a line along which the zoom ring 12 is rotated, and these changes of the characteristics of the pattern 18 are discriminated by a microcomputer 28, as described later. The photo reflector 20 is attached to a stationary cylinder (not shown) of the camera body.

The radiating operation of the radiative device 21 is controlled by a radiative device drive circuit 24, and signals output by the photo detector 22 are input to a binary circuit 26.

The binary circuit 26 transforms the output signal of the photo detector 22 to a binary signal defined by electric "High" and "Low" level signals. Namely, when the sensing beam radiated from the radiative device 21 is reflected by the white stripe 18w, the binary circuit 26 transforms the output signal to a "High" level, and when the sensing beam is reflected by the black stripe 18b, the binary circuit 26 transforms the output signal to a "Low" level. Thereafter, the binary circuit 26 outputs the binary signal to the microcomputer 28.

The microcomputer 28 controls the rotation of the DC motor 16 through the motor drive circuit 14, and counts the number of changes of the output signal of the binary circuit 26. Further, the microcomputer 28 carries out the calculation, control and drive for various well known functions of the camera, such as photometry, distance measurements, and release operations.

In this embodiment, a stopped position of the zoom ring 12 is sensed in accordance with an amount of movement thereof from a base position. Namely, the stopped position is sensed in accordance with the number of changes of the output signals of the binary circuit 26. Therefore, the breadth of each stripe 18b and 18w of the stripe pattern 18 is determined in accordance with a pitch by which the zoom ring 12 is rotated and the positions at which the zoom ring 12 can be stopped.

The microcomputer 28 is also provided with a counter for counting the number of changes of the output signals of the binary circuit 26, and stores a full-opened aperture value and a focal length corresponding to the stopped positions of the zoom ring 12.

The base position of the zoom ring 12 is sensed by a base switch 30 which is turned ON when the zoom ring 12 is positioned at the base position and outputs an ON signal to the microcomputer 28. The microcomputer 28 checks the ON-OFF condition of the base switch 30, to determine whether or not the zoom ring 12 is positioned at the base position, and counts the number of changes of the output signals of the binary circuit 26 to determine the amount of movement of the zoom ring 12 from the base position, to thereby obtain a full-opened aperture value and a focal length corresponding to the amount of movement of the zoom ring 12.

A telephoto switch 32 and a wide-angle switch 34 are connected to the microcomputer 28, as switches for carrying out a zooming operation of the zoom lens 10. The telephoto switch 32 moves the zoom lens 10 toward the telephoto side, and the wide-angle switch 34 moves the zoom lens 10 toward the wide-angle side.

An operation of the lens data reading device of the power zoom lens 10 having the above construction is described below with reference to a flow chart shown in FIG. 2. Note that this operation is carried out according to a control program stored in a non-illustrated read only memory (ROM) of the microcomputer 28.

This program is started when electric power supply is turned ON, and it is determined whether or not the base switch 30 has been turned ON (STEP 51). If the base switch 30 has not been turned ON, the DC motor 16 is rotated toward the wide-angle side (STEP 52). Namely, a base position check loop process composed of STEPs 51 and 52 is repeated until the base switch 30 is turned ON, i.e., until the zoom ring 12 returns to the base position.

When the base switch 30 is turned ON, the DC motor 16 is stopped to stop the zoom operation (STEP 53), and a zoom position counter is reset (STEP 54).

Then, the conditions of the telephoto switch 32 and the wide-angle switch 34 are checked, and if the switches 32 and 34 are turned OFF, this switch check is repeated (STEP 55). If the telephoto switch 32 is turned ON the process goes to STEP 56, and conversely, if the wide-angle switch 34 is turned ON the process goes to STEP 64.

If the telephoto switch 32 is turned ON, it is determined whether or not the value of the zoom position counter has reached the telephoto limit (STEP 56). If the value has not reached the tele limit, the process goes to STEP 57, and if the value has reached the telephoto limit, the process returns to STEP 55 since the DC motor 16 cannot be further rotated toward the telephoto side.

Where the count of the zoom position counter has not reached the tele limit, the radiative device drive circuit 24 is operated to cause the radiative device 21 to radiate a beam (STEP 57), and the DC motor 16 is rotated toward the tele side (STEP 58). Then, it is determined if a change has occurred in an output signal of the binary circuit 26 (STEP 59). If the output signal of the binary circuit 26 has not changed, the process returns to STEP 56, so that a tele zoom process composed of STEPs 56, 57, 58 and 59 is repeated until the output of the binary circuit 26 is changed.

When the output of the binary circuit 26 is changed, the value of the zoom position counter is increased by 1 (STEP 60), and the process waits for a predetermined time (STEP 61). During this waiting time, the sensing beam radiated from the radiative device 21 advances to approximately the center of a black or white stripe 18b or 18w.

Then, the DC motor 16 and the radiation of beam by the radiative device 21 are stopped to stop the zoom operation (STEPs 62 and 63), and the process returns to STEP 55; i.e., the process of STEPs 56 through 63 is repeated.

Namely, the zoom ring 12 is stopped after a predetermined time depending upon a rotational speed of the motor 16 has passed after the microcomputer 28 has sensed a change of the black and white stripes 18b and 18w. That is, the zoom ring 12 is stopped after a predetermined time has passed after the beam radiated from the radiative device 21 crosses a boundary formed on the stripe pattern 18 to define a reflectance change. Then, if the tele switch 32 is still turned ON, the process returns to STEP 55, and the zoom ring 12 is again rotated until stopped at STEP 62.

Namely, the process of STEPs 56 through 63 is provided for intermittently rotating the zoom ring 12 from a position at which the sensing beam radiated from the radiative device 21 reaches the center of a black or white stripe 18b or 18w, to a position at which the sensing beam reaches a center of the adjacent white or black stripe 18w or 18b.

Accordingly, while the tele switch 32 is turned ON, the loop process of STEPs 55 through 63 is repeated, and the zoom ring 12 is intermittently rotated toward the tele side. Then, if the tele switch 32 is turned OFF when the zoom ring 12 is stopped at a position at which the sensing beam of the radiative device 21 is at an approximate center of a black or white stripe 18b or 18w, the switch check process of STEP 55 is repeated.

On the other hand, if the value of the counter reaches the tele limit while the tele switch is turned ON, the process returns from STEP 56 to STEP 55, and only the switch check process and the limit check process are repeated. Therefore, due to the process of STEPs 56 through 63, the zoom ring 12 is stopped at a tele position, at which the sensing beam of the radiative device 21 is at an approximate center of a black or white stripe 18b or 18w.

When the zoom ring 12 is stopped, the microcomputer 28 obtains lens data of a full-opened aperture value or a focal length corresponding to the stopped position of the zoom ring 12, according to the value of the zoom position counter. Then, when a shutter release switch is operated, as is well known, the operations such as an auto focusing, auto exposure and shutter release are carried out.

On the other hand, if the wide-angle switch 34 is turned ON, the process goes from STEP 55 to STEP 64, where it is determined whether or not the value of the zoom position counter has reached the wide-angle limit (STEP 64). If the value has reached the wide-angle limit the process returns to STEP 55, since the DC motor 16 cannot be further rotated toward the wide-angle side, and if the value has not reached the wide-angle limit the radiative device 21 radiates the sensing beam (STEP 65), and the DC motor 16 is rotated toward the wide-angle side (STEP 66). Then, it is determined if a change of an output signal of the binary circuit 26 has occurred (STEP 67), and if the output signal of the binary circuit 26 has not changed, the process returns to STEP 64, and a wide-angle zoom process composed of STEPs 64, 65, 66 and 67 is repeated until the output of the binary circuit 26 is changed.

When the output of the binary circuit 26 is changed, the value of the zoom position counter is decremented by 1 (STEP 68), and the process waits for a predetermined time (STEP 69). Then the DC motor 16 and the radiation of the beam by the radiative device 21 are stopped to stop the zoom operation (STEPs 70 and 71), and as a result, the zoom ring 12 is stopped at a position at which the beam radiated from the radiative device 21 is at an approximate center of a black or white stripe 18b or 18w. The process then returns to STEP 55.

STEPs 64, 65, 66, 67, 68, 69, 70 and 71 are basically the same as STEPs 56 through 63, except that the DC motor 16 is reversely rotated, the value of counter is decremented by 1, and the zoom ring 12 is stopped when reaching the wide-angle limit position.

FIG. 3 shows a flow chart of another embodiment of the operation of the power zoom lens.

Figure 2:
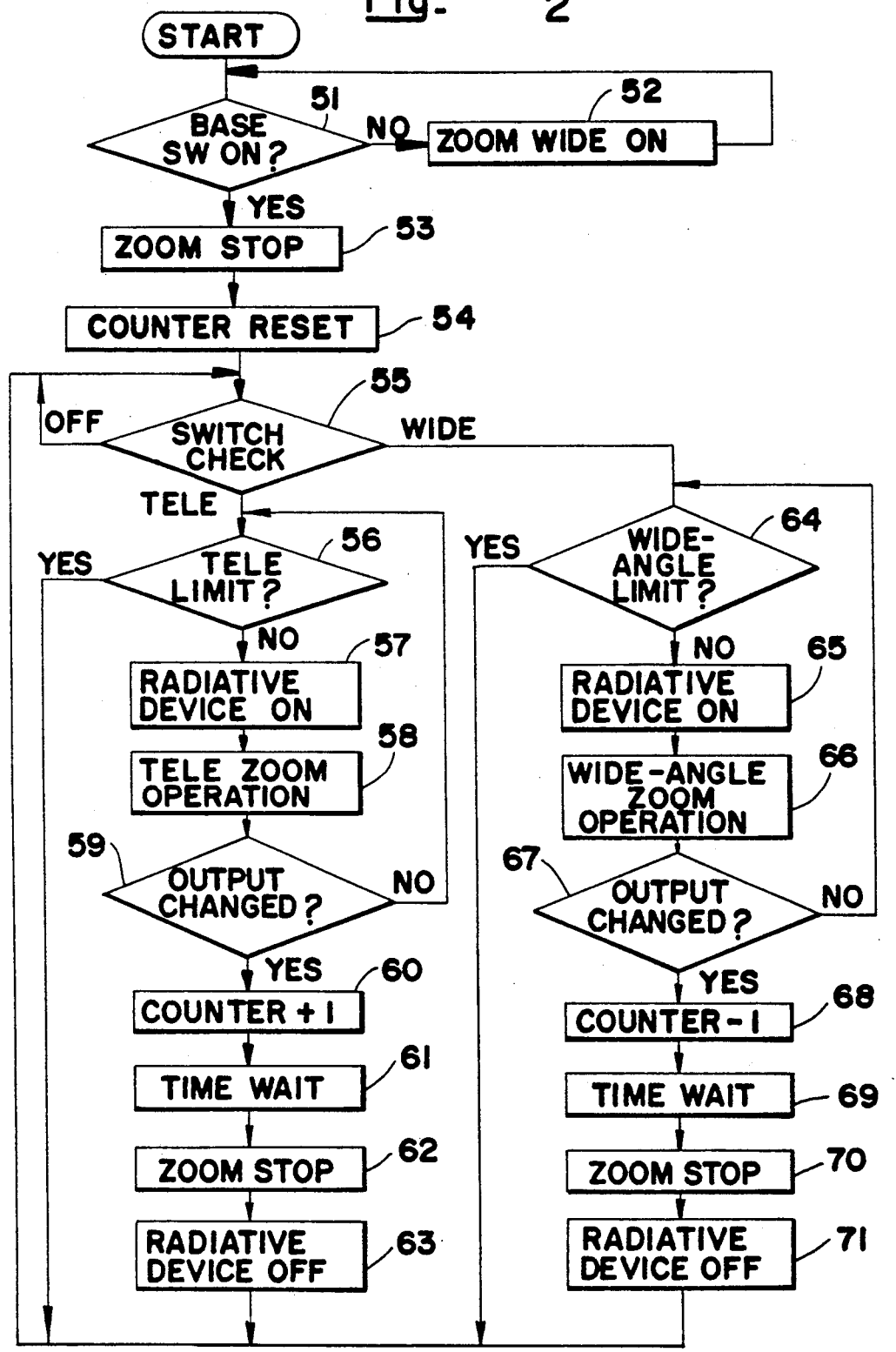
FIG. 2 is a flow chart showing the operation of a first embodiment of the present invention.

This flow chart is different from the flow chart shown in FIG. 2 in that STEPs 91 and 92 are provided after STEPs 60 and 68, respectively. The other STEPs are the same as in FIG. 2.

Namely, in a zooming operation toward the tele side, after the value of the zoom position counter is increased by 1 (STEP 60), it is determined whether or not the tele switch 32 is turned OFF (STEP 91). If the tele switch 32 is not turned OFF, the process from STEP 56 to STEP 60 is carried out so that the zoom ring 12 is further rotated, and if the output signal of the binary circuit 26 has changed, the value of the counter is increased by 1 (STEP 60). Conversely, if the tele switch 32 is turned OFF, the process goes from sTEP 91 to STEP 61, and after a predetermined time has passed, the zoom ring 12 and the radiative device are stopped to stop the zoom operation (STEPs 62 and 63).

In a zooming operation toward the wide-angle side, after the value of the zoom position counter is decremented by 1 (STEP 68), it is determined whether or not the wide-angle switch 34 is turned OFF (STEP 92). If the tele switch 34 is not turned OFF, the process from STEP 64 to STEP 68 is carried out so that the zoom ring 12 is further rotated. If the tele switch 32 is turned OFF (STEP 92), the process goes to STEP 69, and after the predetermined time has passed, the zoom ring 12 and the radiative device are stopped (STEPs 69 and 70).

According to the operation shown in FIG. 3, the zoom ring 12 is continuously (not intermittently) rotated until the tele switch 32 or the wide-angle switch 34 is turned OFF, and is stopped at a position at which the sensing beam from the radiative device 21 is at an approximate center of the black or white stripe 18b or 18w.

According to the embodiments of the present invention, when the sensing beam from the radiative device 21 passes through a boundary between the black and white stripes 18b and 18w and is positioned at an approximate center of another black or white stripe 18b or 18w, the zoom ring 12 is stopped, and thus the number of stripe boundaries passed cannot be misread.

Further, although int he above embodiments, the zoom ring 12 is moved to the base position when an electric power supply is turned ON, the construction can be modified so that the zoom ring 12 is moved to the base position when the electric power supply is turned OFF, and photographing can be carried out as soon as the electric power supply is turned ON. In this case, however, the zoom ring 12 must be once moved to the base position when the electric power supply is turned ON. This is because, if the battery is exhausted when the zoom ring 12 is positioned at a position other than the initial position, or has been removed from the camera, the zoom ring 12 will not be returned to the base position.

In the above description, the present invention is explained with reference to the embodiments applied to the driving of the zoom ring provided on the power zoom lens, but the present invention can be also applied to the driving of a focusing lens drive ring provided for moving a focusing lens of a single focal length lens. Further, although the above description concerns a rotating zooming type zoom ring as a lens drive ring, the type of movement of the zoom ring, i.e., the lens drive ring, is not important. For example, the present invention can be applied to a linear moving lens drive ring, or a linear moving rotating lens drive ring.

The stripe pattern 18 is not restricted to black and white stripes, but can be any pattern by which the amount of movement of the zoom ring 12 from the base position can be detected. Namely, the stripe pattern 18 may be formed by different colored stripes.

As the position sensing mechanism, instead of the optical sensing, a construction in which a magnetic signal is used and the existence or the polarity of the magnetic signal is sensed, or a construction in which a change of an electrostatic capacity is sensed can be used, as long as a sensor sensing a code indicating a stopped positoin of the zoom ring 12 does not stop at a boundary of the code.

As understood from the above description, according to the lens drive device of the embodiments of the present invention, a code indicating the position of the zoom ring 12 is optically read, i.e., without contact, and thus reading errors due to a poor contact or rust do not occur. Further, since the lens drive ring is stopped after sensing that the lens drive ring has passed through a boundary of the code, a code reading error is prevented, and the code of the position at which the lens drive ring is stopped is accurately read. Therefore, accurate lens data such as a full-opened aperture value corresponding to a position at which the lens drive ring is stopped is obtained. Further, since the lens drive ring cannot be overrun, a limit switch sensing a movement limit position of the lens drive ring need not be provided.

Although the embodiments of the present invention have been described herein with reference to the accompanying drawings, obviously many modifications and changes may be made by those skilled in this art without departing from the scope of the invention.

I claim:

1. A device for controlling a stopping position of a moving object, said device comprising:
   a pattern provided in a line along which said moving object is moved, said pattern having characteristics which change in a regular maner along said line, said characteristics being stripes,
   means for discriminating a change in said characteristics of said pattern, and means for issuing a command for stopping said object after a predetermined time has passed after said discrimination means has sensed a change of said characteristics, whereby said object is stopped at a position corresponding approximately to the center of one of said stripes.

2. A device according to claim 1, wherein said device is provided in a camera and said object is a drive ring which is rotated to move a lens group provided in said camera.

3. A device according to claim 2, wherein said camera is provided with a zoom lens including said lens group.

4. A device according to claim 1, wherein said chracteristics of said pattern are stripes formed by different colors.

5. A device according to claim 4, wherein said characteristics of said pattern are stripes formed by black and white colors repeated in a regular manner.

6. A device according to claim 1, wherein said discriminating means includes a non-contact type sensor which senses said characteristics without contact between said sensor and said pattern.

7. A device according to claim 6, wherein said sensor comprises a photo reflector including a radiative device radiating a beam towards said pattern and a photo detector sensing a beam reflected by said pattern.

8. A device according to claim 7, wherein said stopping means stops said object after a predetermined time has passed after said beam radiated from said radiative device crosses a boundary formed on said pattern to define said change of said characteristics.

9. The device for controlling a stopping portion according to claim 1, wherein said predetermined time is a waiting time.

* * * * *

UNITED STATES PATENT AND TRADEMARK OFFICE
CERTIFICATE OF CORRECTION

PATENT NO. : 5,142,314
DATED : August 25, 1992
INVENTOR(S) : Kimiaki OGAWA

It is certified that error appears in the above-indentified patent and that said Letters Patent is hereby corrected as shown below:

On the title page, item: [73], Assignee, line 1, change "Kogy" to ---Kogyo---.

On the title page, item: [57], Abstract, line 10, change "stripes." to ---stripes,---.

At column 8, line 40 (claim 6, line 2), delete "type".

Signed and Sealed this

Twenty-sixth Day of December, 1995

Attest:

BRUCE LEHMAN

Attesting Officer   Commissioner of Patents and Trademarks